(12) United States Patent
Kumashiro et al.

(10) Patent No.: US 8,040,486 B2
(45) Date of Patent: Oct. 18, 2011

(54) INK FOR FORMING LIQUID CRYSTAL SPACER AND LIQUID CRYSTAL DISPLAY DEVICE USING SUCH INK

(75) Inventors: Yasushi Kumashiro, Tsukuba (JP);
Naoki Maruyama, Tsukuba (JP);
Kazunori Yamamoto, Tsukuba (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 198 days.

(21) Appl. No.: 12/296,143

(22) PCT Filed: Mar. 28, 2007

(86) PCT No.: PCT/JP2007/056595
§ 371 (c)(1),
(2), (4) Date: Mar. 9, 2009

(87) PCT Pub. No.: WO2007/114145
PCT Pub. Date: Oct. 11, 2007

(65) Prior Publication Data
US 2010/0328599 A1 Dec. 30, 2010

(30) Foreign Application Priority Data
Apr. 6, 2006 (JP) .............................. P2006-105168

(51) Int. Cl.
*G02F 1/1339* (2006.01)
(52) U.S. Cl. ........................................................ 349/155
(58) Field of Classification Search .................. None
See application file for complete search history.

(56) References Cited

U.S. PATENT DOCUMENTS

| | | | | |
|---|---|---|---|---|
| 2003/0095168 A1* | 5/2003 | Blease et al. | | 347/92 |
| 2004/0257416 A1* | 12/2004 | Kim et al. | | 347/100 |
| 2006/0001824 A1* | 1/2006 | Yamaguchi et al. | | 349/155 |
| 2007/0019148 A1* | 1/2007 | Ueda | | 349/155 |
| 2008/0137025 A1* | 6/2008 | Ueda | | 349/155 |

FOREIGN PATENT DOCUMENTS

| | | |
|---|---|---|
| EP | 1 072 932 A2 | 1/2001 |
| EP | 1 072 932 A3 | 5/2004 |
| JP | 09-105946 | 4/1997 |
| JP | 10-096933 | 4/1998 |
| JP | 2001-083524 | 3/2001 |

(Continued)

OTHER PUBLICATIONS

Notification of Transmittal of Translation of the International Preliminary Report on Patentability dated Nov. 27, 2008, for Application No. PCT/JP2007/056595.

(Continued)

*Primary Examiner* — Mike Stahl
(74) *Attorney, Agent, or Firm* — Antonelli, Terry, Stout & Kraus, LLP.

(57) ABSTRACT

The object of the invention is to provide a liquid crystal spacer-forming ink that can sufficiently reduce the dot diameter of liquid crystal spacers formed by ink jet printing, and specifically it provides a liquid crystal spacer-forming ink with a surface tension of at least 28 mN/m at 25° C. and a viscosity of no greater than 50 mPa·s at 25° C.

17 Claims, 5 Drawing Sheets

FOREIGN PATENT DOCUMENTS

| | | |
|---|---|---|
| JP | 2003-080694 | 3/2003 |
| JP | 2004-013116 | 1/2004 |
| JP | 2005-268543 | 9/2005 |
| JP | 2006-504857 | 2/2006 |
| WO | WO2004/065502 | 8/2004 |

OTHER PUBLICATIONS

Supplementary European Search Report and European Search Opinion dated Oct. 18, 2009, for Application No. EP 07 74 0033.
Korean Official Action dated May 27, 2011, for KR Application No. 10-2008-7026490.

* cited by examiner

INK FOR FORMING LIQUID CRYSTAL SPACER AND LIQUID CRYSTAL DISPLAY DEVICE USING SUCH INK

TECHNICAL FIELD

The present invention relates to a liquid crystal spacer-forming ink and to a liquid crystal display device using it.

BACKGROUND ART

Liquid crystal display devices have come into use in recent years as display devices, such as color television sets and monitors for personal computers. In such liquid crystal display devices, a gap of about 1-10 µm is formed between two transparent panels of glass, for example, that are provided with transparent electrodes, and a liquid crystal substance is enclosed in the gap to form a liquid crystal layer. An electric field is then applied to the liquid crystal layer through the electrodes, thereby orienting the liquid crystal substance in order to control transmission and non-transmission of backlight rays to display an image.

If the thickness of the liquid crystal layer is not consistent in such a liquid crystal display device, display irregularities and contrast anomalies may result. For this reason, in the past, beads of silica particles, metal oxide particles, thermoplastic resin particles or the like, having a uniform particle size distribution, have been placed between the panels as spacers in order to maintain a consistent gap between the panels and maintain a fixed thickness for the liquid crystal layer.

However, since liquid crystal spacers obtained using such particles (particulate spacers) are situated on the panel by dispersion, they are not anchored onto the panel surfaces, and therefore vibrations propagated in the liquid crystal display device can displace the particulate spacers and cause display variations. In addition, because the particulate spacers are situated by dispersion it is not possible to achieve precise placement to obtain a consistently even distribution, and the particulate spacers may become situated at undesired sections, leading to display defects including display variance and dropouts.

One strategy aimed at avoiding the problem of displacement of the particulate spacers has been to cover the surfaces of the particulate spacers with a deposited layer comprising a low-melting-point synthetic resin or wax. However, because the particulate spacers forming the deposited layer are also placed on the panel by dispersion, it is impossible to avoid the problem of uneven distribution.

Other methods devised to solve the aforementioned problem include methods of forming the liquid crystal spacers by coating an ultraviolet curing resin onto one panel, and then drying, exposing and developing (photolithographic methods). Since such methods allow formation of patterns for liquid crystal spacers at the desired locations and generally can provide adhesive force suitable for panels, they are able to improve the problems of abnormal orientation and reduced contrast, compared to particulate spacers.

Such photolithographic methods, however, require removal of the undesired sections after the entire panel surface has been coated with the spacer material, and this not only increases material loss but also adds steps for development and release, thus lengthening the manufacturing line. In addition, photolithography plates must be prepared for different products in order to form the spacers at the desired locations, thus complicating the process. Also, with increasing product sizes of liquid crystal display devices in recent years, it has become ever more difficult to evenly coat the spacer materials and prepare appropriate plates for the larger sizes.

Ink jet printing devices of the kind described in Patent document 1 have been proposed recently for formation of wirings on printed circuit boards and the like. Ink jet printing devices allow direct patterning from electronic data such as CAD data, and are therefore advantageous by eliminating the need to prepare photolithography plates. Moreover, the volume of droplets discharged from the head can be consistently controlled, thus helping to avoid thickness irregularities in the formed film pattern.

The use of ink jet printing devices in the production of color filters with spacers has also been proposed (see Patent document 2). In such methods, spacers are formed on color filters by ink jet printing, and the color filters with the spacers are used as plates between which the liquid crystals are sandwiched.

[Patent document 1] Japanese Unexamined Patent Publication No. 2003-80694
[Patent document 2] Japanese Unexamined Patent Publication No. 2001-83524

DISCLOSURE OF THE INVENTION

Problems to be Solved by the Invention

The number of display pixels in liquid crystal display devices continues to increase year by year toward the goal of obtaining more high definition images, and as a result smaller and smaller diameters are being required for the spacers that are formed on panels. In theory, ink jet printing reduces the discharged droplet volume, thus allowing smaller dot diameters to be achieved. However, reducing the dot diameters in such a manner makes it difficult to ensure stability of the discharge.

The present invention has been accomplished in light of these circumstances, and its object is to provide a liquid crystal spacer-forming ink that can sufficiently reduce the dot diameters of liquid crystal spacers formed by ink jet printing methods, as well as a liquid crystal display device employing it.

Means for Solving the Problems

In order to achieve the object stated above, the invention provides a liquid crystal spacer-forming ink having a surface tension of at least 28 mN/m at 25° C. and a viscosity of no greater than 50 mPa·s at 25° C.

A liquid crystal spacer-forming ink having surface tension and viscosity in the aforementioned ranges can sufficiently reduce the dot diameters when liquid crystal spacers are formed by ink jet printing. The liquid crystal spacer-forming ink can also adequately avoid clogging of the ink-jet head to obtain satisfactory printability.

The liquid crystal spacer-forming ink of the invention preferably comprises an insulating resin composition and a solvent with a vapor pressure of less than $1.34 \times 10^3$ Pa at 25° C. Including such a solvent in the liquid crystal spacer-forming ink can sufficiently prevent increase in the ink viscosity due to volatilization of the solvent, and thus adequately avoid clogging of ink-jet heads.

The insulating resin composition preferably contains a thermosetting resin. By including a thermosetting resin as the insulating resin composition, the liquid crystal spacer-forming ink can exhibit a lower viscosity and more stable discharge properties.

The insulating resin composition preferably contains an epoxy resin and a curing agent. By including an epoxy resin and curing agent as the insulating resin composition, an epoxy resin and curing agent with different resin backbones can be selected for use in the liquid crystal spacer-forming ink, thereby permitting the physical properties of the cured product to be controlled to the desired values.

From the viewpoint of heat resistance and adhesion, the epoxy resin is preferably a glycidyl ether compound obtained by condensation reaction between a phenol compound and an aldehyde compound. From the same viewpoint, the curing agent is preferably a condensation product obtained by condensation reaction between a phenol compound and an aldehyde compound.

The liquid crystal spacer-forming ink of the invention may also contain particles having a standard deviation of no greater than 10% between their diameters. Including such particles in the liquid crystal spacer-forming ink will allow a more consistent thickness to be maintained for the liquid crystal layer.

The particles preferably are particles having a mean particle size of 1.0-10.0 μm. By selecting a desired particle size within 1.0-10.0 μm as the mean particle size for the particles, it is possible to maintain a consistent appropriate value for the thickness of the liquid crystal layer.

The particles may be particles composed of an inorganic compound or particles composed of an organic compound. The particles are preferably composed of an inorganic compound from the viewpoint of deformation resistance and heat resistance. On the other hand, the particles are preferably composed of an organic compound from the viewpoint of easier adjustment of the physical properties.

The invention provides a liquid crystal display device comprising two panels situated facing each other, a liquid crystal layer composed of a liquid crystal substance enclosed between the panels and a liquid crystal spacer situated between the panels in order to maintain a consistent thickness of the liquid crystal layer, wherein the liquid crystal spacer is formed at a desired location on the panels by ink jet printing using the aforementioned liquid crystal spacer-forming ink of the invention.

Since the liquid crystal spacer in the liquid crystal display device is formed using the liquid crystal spacer-forming ink of the invention, it is possible to sufficiently reduce the dot diameter of the liquid crystal spacer and achieve even higher definition. Also, forming the liquid crystal spacer by an ink jet printing process using the liquid crystal spacer-forming ink of the invention can shorten the process time and efficiently form the liquid crystal spacer at the desired location of the panels.

Effect of the Invention

According to the invention it is possible to provide a liquid crystal spacer-forming ink that can sufficiently reduce the dot diameters of liquid crystal spacers formed by ink jet printing. Also according to the invention, it is possible to provide high definition liquid crystal display devices having liquid crystal spacers formed by ink jet printing using the aforementioned liquid crystal spacer-forming ink.

EXPLANATION OF SYMBOLS

Figure 1:
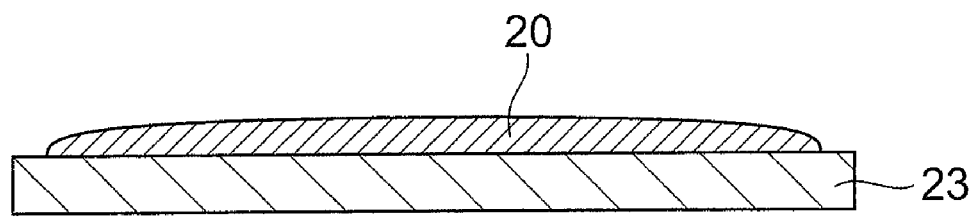
FIG. 1 is a schematic cross-sectional view of an example of a liquid crystal spacer formed by an ink jet printing process using a liquid crystal spacer-forming ink containing no particles.

1: Liquid crystal display device, 2a, 2b: electrodes, 3a, 3b: panel members, 5a, 5b: polarizing plates, 6a, 6b: panels, 7: color filter, 8: retardation panel, 9: backlight, 10, 20: liquid crystal spacers, 13: sealant, 17a, 17b: orientation layers, 18: liquid crystal layer, 21: particles, 22: resin, 23: panel.

BEST MODE FOR CARRYING OUT THE INVENTION

Preferred embodiments of the invention will now be explained in detail, with reference to the accompanying drawings as necessary. Identical or corresponding parts in the drawings will be referred to by like reference numerals and will be explained only once.

The liquid crystal spacer-forming ink (liquid crystal display device spacer-forming ink) of the invention may be suitably used for formation of a liquid crystal spacer by ink jet printing.

The liquid crystal spacer-forming ink must have a surface tension of at least 28 mN/m at 25° C. An ink surface tension of at least 28 mN/m will allow a sufficiently small dot diameter to be achieved for the obtained liquid crystal spacer when the ink is printed on the panel by an ink jet printing process. The surface tension of the liquid crystal spacer-forming ink at 25° C. is more preferably in the range of 28-80 mN/m to more satisfactorily reduce the dot diameter of the liquid crystal spacer. The liquid crystal spacer-forming ink of the invention may also contain added components such as commonly known additives or solvents, resins, water and the like, in order to adjust the surface free energy to the desired range.

The viscosity of the liquid crystal spacer-forming ink of the invention must be no greater than 50 mPa·s at 25° C. An ink viscosity of no greater than 50 mPa·s will adequately prevent nozzle discharge interruption and nozzle clogging during ink jet printing, thus improving the printing properties. The viscosity of the liquid crystal spacer-forming ink at 25° C. is more preferably 3-30 mPa·s in order to further improve the printing property and effectively reduce droplet sizes.

The liquid crystal spacer-forming ink of the invention preferably comprises an insulating resin composition and a solvent with a vapor pressure of less than $1.34 \times 10^3$ Pa at 25° C.

By using a solvent with a vapor pressure of less than $1.34 \times 10^3$ Pa at 25° C. in the liquid crystal spacer-forming ink of the invention, it is possible to adequately inhibit increase in the ink viscosity that occurs due to volatilization of the solvent. If an ink with a vapor pressure of at least $1.34 \times 10^3$ at 25° C., for example, is used, the droplets will dry quickly and discharge of the droplets from the nozzle of the ink-jet head will be hampered, also promoting clogging of the ink-jet head. This phenomenon can be avoided, however, if the vapor pressure of the ink is a desired value of less than $1.34 \times 10^3$ Pa. The liquid crystal spacer-forming ink of the invention may contain both a solvent with a vapor pressure of less than $1.34 \times 10^3$ Pa and a solvent with a vapor pressure of $1.34 \times 10^3$ Pa or greater, in which case the mixing proportion of the latter is preferably no greater than 60 mass %, more preferably no greater than 50 mass % and even more preferably no greater than 40 mass % based on the total mass of the solvent.

Each solvent may be any one whose vapor pressure at 25° C. is within the desired range and which can disperse or dissolve the insulating resin described hereunder. As specific solvents with a vapor pressure of less than $1.34 \times 10^3$ Pa at 25° C. there may be mentioned γ-butyrolactone, cyclohexanone, N-methyl-2-pyrrolidone, anisole, ethyleneglycol monomethyl ether acetate, diethyleneglycol dimethyl ether, triethyleneglycol monomethyl ether, triethyleneglycol dimethyl ether, dipropyleneglycol monomethyl ether and tripropyleneglycol dimethyl ether. As specific solvents with a vapor pressure of $1.34 \times 10^3$ Pa or greater at 25° C. there may be mentioned methyl ethyl ketone, methyl isobutyl ketone, toluene and isopropyl alcohol. These solvents may be used alone or in combinations of two or more.

The proportion of the solvent in the liquid crystal spacer-forming ink is not particularly restricted, and it is preferably adjusted as appropriate so that the viscosity and surface tension of the liquid crystal spacer-forming ink at 25° C. are within the aforementioned specified ranges, and for most purposes it is preferred to be 50-99 mass % based on the total mass of the liquid crystal spacer-forming ink.

The insulating resin composition used in the liquid crystal spacer-forming ink of the invention may be one that ordinarily exhibits electrical insulating properties and which contains a material that imparts adhesion to the base, and examples thereof include compositions containing monomers, oligomers and polymers forming epoxy resins, phenol resins, polyimide resins, polyamide resins, polyamideimide resins, silicone-modified polyamideimide resins, polyester resins, cyanate ester resins, BT resins, acrylic resins, melamine resins, urethane resins, alkyd resins and the like. Any of these may be used alone or in combinations of two or more.

When such insulator materials are used in printed circuit boards, it is preferred to use resin compositions containing thermosetting resins from the viewpoint of heat resistance, insulating properties and adhesion, while it is especially preferred to use an epoxy resin-containing resin composition. When using a thermosetting resin, the liquid crystal spacer may be formed by first dissolving the monomer or oligomer in a solvent if necessary and coating it onto the panel, and then heat treating it to remove the solvent and cure the resin. The resin composition may also contain added curing accelerators, coupling agents, antioxidants, fillers and the like as necessary.

As examples of epoxy resins there may be mentioned bisphenol A-type epoxy resins, bisphenol F-type epoxy resins, bisphenol S-type epoxy resins, biphenol-type epoxy resins, alicyclic epoxy resins, aliphatic chain epoxy resins, glycidyl ester-type epoxy resins, and glycidyl ether compounds obtained by condensation reaction of phenol compounds and aldehyde compounds.

Preferred epoxy resins among those mentioned above from the viewpoint of heat resistance and adhesion are glycidyl ether compounds obtained by condensation reaction between phenol compounds and aldehyde compounds.

As phenol compounds there may be mentioned phenols, cresols, alkylphenols, catechols, bisphenol F, bisphenol A, bisphenol S and the like. As aldehyde compounds there may be mentioned formaldehyde and salicylaldehyde.

In addition to the epoxy resins mentioned above there may be used, for example, glycidyl ether compounds of bifunctional phenols, glycidyl ether compounds of bifunctional alcohols, glycidyl ether compounds of polyphenols, and hydrogenated or halogenated forms of the foregoing.

There are no particular restrictions on the molecular weight of such epoxy resins. The aforementioned epoxy resins may also be used alone or in combinations of two or more.

The resin composition in the liquid crystal spacer-forming ink of the invention preferably contains both the aforementioned epoxy resin and a curing agent to cure the epoxy resin.

As examples of curing agents to be used with the epoxy resin there may be mentioned amines such as diethylenetriamine, triethylenetetramine, metaxylenediamine, diaminodiphenylmethane, diaminodiphenylsulfone, m-phenylenediamine and dicyandiamide; acid anhydrides such as phthalic anhydride, tetrahydrophthalic anhydride, hexahydrophthalic anhydride, methyltetrahydrophthalic anhydride, methylhexahydrophthalic anhydride, methylnadic anhydride, pyromellitic anhydride and trimellitic anhydride; imidazoles such as imidazole, 2-ethylimidazole, 2-ethyl-4-methylimidazole, 2-phenylimidazole, 2-undecylimidazole, 1-benzyl-2-methylimidazole, 2-heptadecylimidazole, 4,5-diphenylimidazole, 2-methylimidazoline, 2-phenylimidazoline, 2-undecylimidazoline, 2-heptadecylimidazoline, 2-isopropylimidazole, 2,4-dimethylimidazole, 2-phenyl-4-methylimidazole, 2-ethylimidazoline, 2-isopropylimidazoline, 2,4-dimethylimidazoline and 2-phenyl-4-methylimidazoline; imidazoles having their imino groups masked with acrylonitrile, phenylene diisocyanate, toluidine isocyanate, naphthalene diisocyanate, methylenebisphenol isocyanate, melamine acrylate or the like; phenols such as bisphenol F, bisphenol A, bisphenol S and polyvinylphenol; and condensation products of phenol compounds such as phenol, cresol, alkylphenol, catechol, bisphenol F, bisphenol A or bisphenol with aldehyde compounds such as formaldehyde or salicylaldehyde, and halogenated forms of the foregoing. Preferred curing agents among these, from the viewpoint of heat resistance and adhesion, are condensation products of phenol compounds and aldehyde compounds. There are no particular restrictions on the molecular weights of these compounds. The curing agents mentioned above may also be used alone or in combinations of two or more.

The proportion of the insulating resin composition in the liquid crystal spacer-forming ink is preferably adjusted as appropriate so that the viscosity and surface tension of the liquid crystal spacer-forming ink at 25° C. are within the aforementioned specified ranges, and for most purposes it is preferred to be 1-50 mass % based on the total mass of the liquid crystal spacer-forming ink.

The liquid crystal spacer-forming ink of the invention also preferably contains particles having a standard deviation of no greater than 10% between their diameters. The standard deviation between the diameters of the particles is more preferably no greater than 5% and most preferably no greater than 3%. By using particles having a standard deviation of no greater than 10% between their diameters, it is possible to prevent variation in the thickness of the liquid crystal layer.

The diameters of the particles may be selected as appropriate for the desired gap between the panels, but generally particles with a mean particle size of 1.0-10.0 μm will be used. By selecting particles with diameters for the intended liquid crystal layer thickness, it is possible to consistently maintain the desired value for the liquid crystal layer thickness.

The material of the particles (beads) is preferably an inorganic compound such as silica, glass or metal oxide, or organic particles composed of a plastic such as a crosslinked polymer that does not dissolve in the solvent, such as a spherical polymer obtained by polymerizing or crosslinking a monomer such as polystyrene, polypropylene, silicone resin, divinylbenzene, benzoguanamine or styrene. Such particles may be particles conventionally used as particulate spacers in dispersion methods, or particles having dynamic properties or purity equivalent to such particles. The particles mentioned above may also be used alone or in combinations of two or more.

The proportion of the particles in the liquid crystal spacer-forming ink is preferably adjusted as appropriate so that the viscosity and surface tension of the liquid crystal spacer-forming ink at 25° C. are within the aforementioned specified ranges, and for most purposes it is preferred to be 0.01-25 mass % based on the total mass of the liquid crystal spacer-forming ink.

For improved particle dispersibility, preferably one or a combination of different dispersion treatments is carried out with a disperser such as a homogenizer, bead mill or sand mill after the particles have been dispersed in the resin solution, or with the particles in admixture with the solvent. This can reduce the mean dispersed particle size of the particles. The particles can also be dispersed using an apparatus equipped with an ultrasonic oscillator. When bubbles have been generated in the obtained composite material solution following the dispersion, they may be removed from the composite material solution by standing under reduced pressure or by stirred degassing under reduced pressure.

Figure 2:
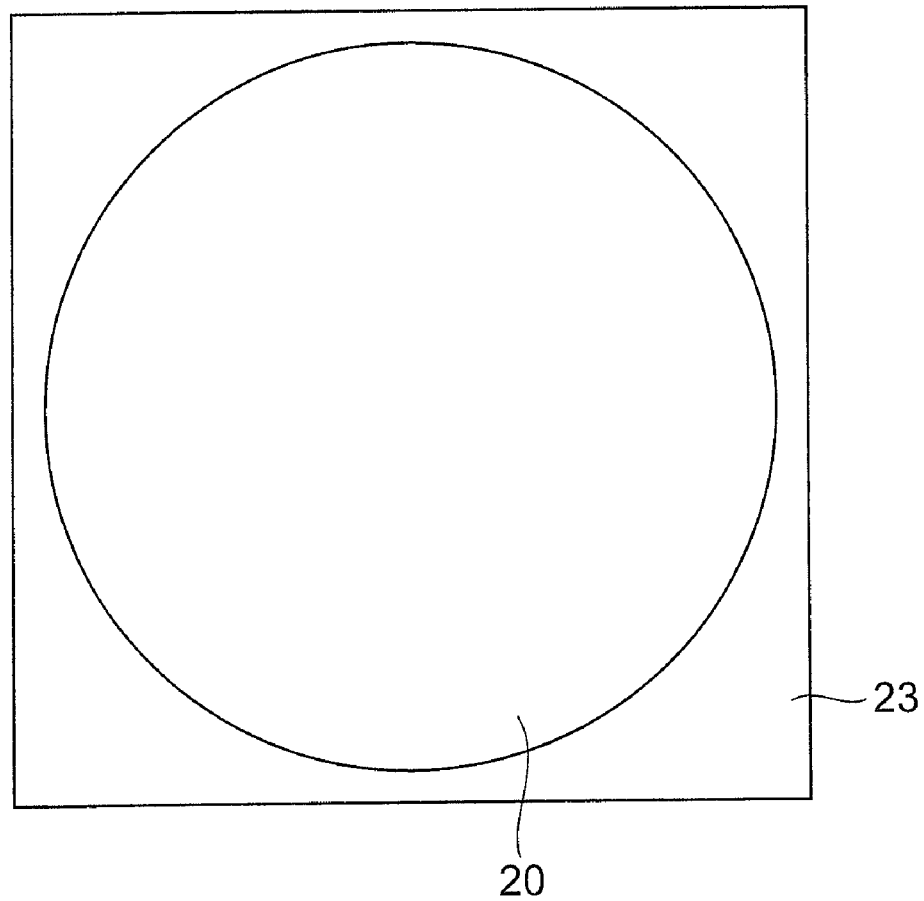
FIG. 2 is a top view of the liquid crystal spacer in FIG. 1.

FIG. 1 is a schematic cross-sectional view of an example of a liquid crystal spacer formed on a panel by an ink jet printing process using a liquid crystal spacer-forming ink according to the invention. FIG. 2 is a top view of the liquid crystal spacer in FIG. 1. As shown in FIGS. 1 and 2, the liquid crystal spacer 20 is formed by drying the aforementioned liquid crystal spacer-forming ink, and it is composed of a resin without the particles described above, forming a dot on the panel 23. Since the liquid crystal spacer 20 is formed using the liquid crystal spacer-forming ink of the invention, the diameter of the dot can be sufficiently reduced.

Figure 3:
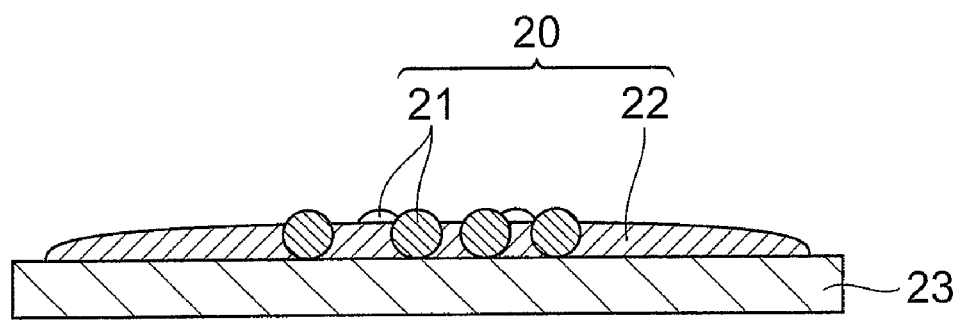
FIG. 3 is a schematic cross-sectional view of an example of a liquid crystal spacer formed by an ink jet printing process using a liquid crystal spacer-forming ink containing particles.
Figure 4:
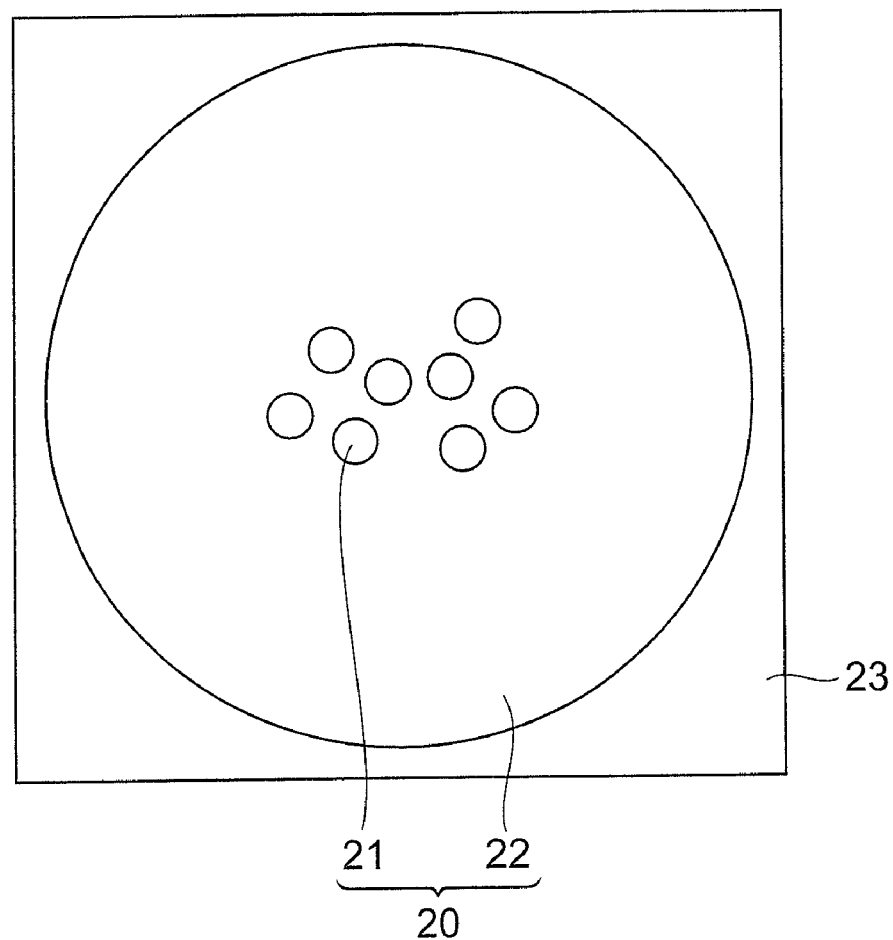
FIG. 4 is a top view of the liquid crystal spacer in FIG. 3.

FIG. 3, on the other hand, is a schematic cross-sectional view of an example of a liquid crystal spacer formed on a panel by an ink jet printing process using a liquid crystal spacer-forming ink according to the invention containing the particles described above. FIG. 4 is a top view of the liquid crystal spacer in FIG. 3. As shown in FIGS. 1 and 2, the liquid crystal spacer 20 is formed by drying the aforementioned liquid crystal spacer-forming ink, and it is composed of particles 21 and a resin 22, forming a dot on the panel 23. Since the liquid crystal spacer 20 is formed using the liquid crystal spacer-forming ink of the invention, the diameter of the dot can be sufficiently reduced. Also, the presence of the particles 21 in the liquid crystal spacer 20 increases the effect of maintaining a consistent liquid crystal layer thickness when the liquid crystal display device has been formed. Since the liquid crystal spacer 20 is formed as a dot using the liquid crystal spacer-forming ink, the particles 21 more readily tend to aggregate toward the center of the liquid crystal spacer 20, as shown in FIGS. 3 and 4, by the convection current in the droplets during heating and drying. Consequently, the particles 21 are not situated at undesired sections and it is therefore easier to maintain a consistent thickness of the liquid crystal layer when the liquid crystal display device has been formed.

A liquid crystal display device according to the invention will now be described. The liquid crystal display device of the invention is a liquid crystal display device comprising two panels situated facing each other, a liquid crystal layer composed of a liquid crystal substance enclosed between the panels, and a liquid crystal spacer situated between the panels to maintain a consistent thickness for the liquid crystal layer. The liquid crystal spacer is formed at a desired location on a panel by an ink jet printing process using a liquid crystal spacer-forming ink according to the invention as described above. The liquid crystal spacer can be formed, for example, by coating the liquid crystal spacer-forming ink at desired locations of the panel using an ink jet printing device and heat treating it to cure the resin and/or remove the solvent.

Figure 5:
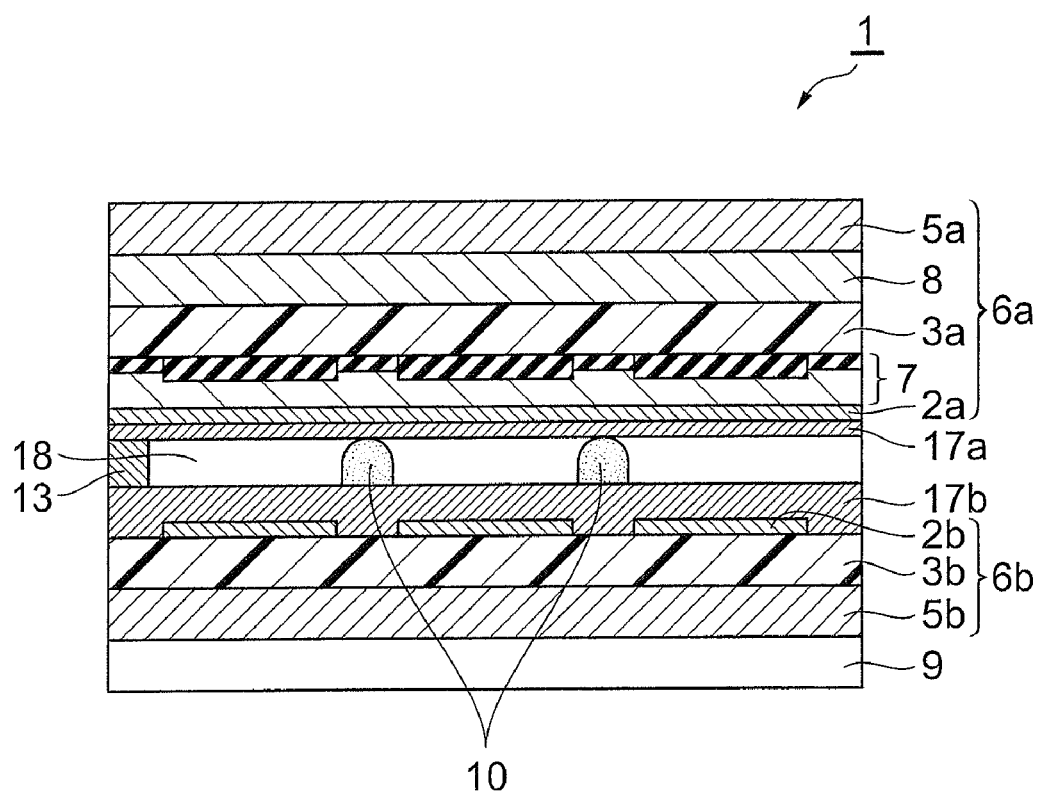
FIG. 5 is a schematic cross-sectional view of an embodiment of a liquid crystal display device according to the invention.

FIG. 5 is a schematic cross-sectional view of an embodiment of a liquid crystal display device according to the invention. As shown in FIG. 5, the liquid crystal display device 1 comprises a pair of panel members 6a, 6b situated facing each other. The panel member 6a comprises an electrode 2a, color filter 7, panel 3a, retardation panel 8 and polarizing plate 5a, laminated in that order. The panel member 6b comprises an electrode 2b, panel 3b and polarizing plate 5b, laminated in that order. A backlight 9 is situated on the external side of the polarizing plate 5b in the panel member 6b. Also, orientation layers 17a, 17b are laminated on the sides of the panel members 6a, 6b on which the electrodes 2a, 2b are formed. The liquid crystal layer 18 is sandwiched by the panel members 6a, 6b via the orientation layers 17a, 17b. A sealant 13 is also provided between the panel members 6a, 6b at the edge of the liquid crystal layer 18, serving to bond the panel members 6a, 6b.

In this type of liquid crystal display device, as shown in FIG. 5, liquid crystal spacers 10 are set at prescribed locations of the liquid crystal display device 1 to ensure a consistent thickness for the liquid crystal layer 18. From the viewpoint of displaying high quality images, the liquid crystal spacers 10 are preferably set at locations other than the display dots at the translucent sections.

The liquid crystal spacers 10 are preferably set at equal spacings across the entire image display region. Since the liquid crystal spacers 10 are formed by an ink jet printing process using a liquid crystal spacer-forming ink according to the invention, they can be easily situated at equal spacings across the entire image display region and the dot diameters can be sufficiently reduced, in order to realize a particularly high definition liquid crystal display device.

The panel members 6a, b shown in FIG. 5 have the structure with each of the laminated layers mentioned above, but they do not necessarily need to include all of the layers. If necessary, the panel members 6a, b may further comprise an insulating layer, black matrix layer, shock-absorber layer, TFT and the like.

As the electrodes 2a, b there may be used transparent electrodes made of tin-doped indium oxide (ITO) or the like. As the panels 3a, b there may be mentioned plastic panels, glass panels and the like. Known materials may be used for the color filter 7, retardation panel 8, polarizing plates 5a, b and backlight 9. The orientation layers 17a, b may be formed using a known liquid crystal orienting agent.

EXAMPLES

The present invention will now be explained in greater detail based on examples and comparative examples, with the understanding that the invention is in no way limited to the examples. The viscosities of the liquid crystal spacer-forming inks of the examples and comparative examples were measured at 25° C. using a CJV5000 small oscillating viscometer, trade name of A&D Co., Ltd. Also, the surface tensions of the liquid crystal spacer-forming inks were measured at 25° C. using a surface tension measuring apparatus based on the Wilhelmy method (platinum plate method), and a fully automatic surface tension meter by Kyowa Interface Science Co., Ltd. (trade name: CBVP-Z).

Example 1

There were dissolved 9.68 g of a bisphenol A-novolac type epoxy resin (trade name: N-865, product of Dainippon Ink and Chemicals, Inc.), 5.31 g of a bisphenol A-novolac resin (trade name: VH-4170, product of Dainippon Ink and Chemicals, Inc.) and 0.01 g of 2-ethyl-4-methylimidazole (product of Tokyo Kasei Kogyo Co., Ltd.) in 85.0 g of γ-butyrolactone (vapor pressure at 25° C.: $2.3 \times 10^2$ Pa) to obtain a liquid crystal spacer-forming ink with a viscosity of 5.8 mPa·s and a surface tension of 44.1 mN/m.

Example 2

To the liquid crystal spacer-forming ink obtained in Example 1 there was added 0.03 g of a polyether-modified polymethylalkylsiloxane solution (trade name: BYK-320, product of Byk-Chemie Corp.) to obtain a liquid crystal spacer-forming ink with a viscosity of 5.6 mPa·s and a surface tension of 43.8 mN/m.

Example 3

To the liquid crystal spacer-forming ink obtained in Example 1 there was added 0.1 g of a vinyl-based polymer (trade name: DISPARLON LHP-90, product of Kusumoto Chemicals, Ltd.) to obtain a liquid crystal spacer-forming ink with a viscosity of 5.7 mPa·s and a surface tension of 34.0 mN/m.

Example 4

There were dissolved 9.68 g of a bisphenol A-novolac type epoxy resin (trade name: N-865, product of Dainippon Ink and Chemicals, Inc.), 5.31 g of a bisphenol A-novolac resin (trade name: VH-4170, product of Dainippon Ink and Chemicals, Inc.) and 0.01 g of 2-ethyl-4-methylimidazole (product of Tokyo Kasei Kogyo Co., Ltd.) in 60.0 g of γ-butyrolactone (vapor pressure at 25° C.: $2.3 \times 10^2$ Pa) to obtain a liquid crystal spacer-forming ink with a viscosity of 8.9 mPa·s and a surface tension of 44.1 mN/m.

Example 5

To the liquid crystal spacer-forming ink obtained in Example 1 there was added 0.6 g of spherical crosslinked polymer particles obtained by crosslinking divinylbenzene monomer (mean particle size: 3.8 μm, standard deviation: 5%), and the mixture was stirred with a homogenizer (5,500 rpm, 5 min) to obtain a liquid crystal spacer-forming ink with a viscosity of 5.8 mPa·s and a surface tension of 44.1 mN/m.

Example 6

To the liquid crystal spacer-forming ink obtained in Example 1 there was added 1.2 g of spherical crosslinked polymer particles obtained by crosslinking divinylbenzene monomer (mean particle size: 3.8 μm, standard deviation: 5%), and the mixture was stirred with a homogenizer (5,500 rpm, 5 min) to obtain a liquid crystal spacer-forming ink with a viscosity of 6.1 mPa·s and a surface tension of 44.1 mN/m.

Example 7

There were dissolved 9.68 g of a bisphenol A-novolac type epoxy resin (trade name: N-865, product of Dainippon Ink and Chemicals, Inc.), 5.31 g of a bisphenol A-novolac resin (trade name: VH-4170, product of Dainippon Ink and Chemicals, Inc.) and 0.01 g of 2-ethyl-4-methylimidazole (product of Tokyo Kasei Kogyo Co., Ltd.) in 60.0 g of γ-butyrolactone (vapor pressure at 25° C.: $2.3 \times 10^2$ Pa) to obtain a resin solution. To this there was added 1.0 g of spherical crosslinked polymer particles obtained by crosslinking divinylbenzene monomer (mean particle size: 3.8 μm, standard deviation: 5%), and the mixture was stirred with a homogenizer (5,500 rpm, 5 min) to obtain a liquid crystal spacer-forming ink with a viscosity of 9.9 mPa·s and a surface tension of 44.1 mN/m.

Comparative Example 1

To the liquid crystal spacer-forming ink obtained in Example 1 there was added 0.1 g of an acrylic-based polymer (trade name: DISPARLON LHP-95, product of Kusumoto Chemicals, Ltd.) to obtain a liquid crystal spacer-forming ink with a viscosity of 5.7 mPa·s and a surface tension of 25.0 mN/m.

Comparative Example 2

A liquid crystal spacer-forming ink with a viscosity of 3.0 mPa·s and a surface tension of 24.0 mN/m was obtained in the same manner as Example 1, except that 85.0 g of methyl ethyl ketone (vapor pressure at 25° C.: $1.2 \times 10^4$ Pa) was used instead of the 85.0 g of γ-butyrolactone.

Comparative Example 3

There were dissolved 9.68 g of a bisphenol A-novolac type epoxy resin (trade name: N-865, product of Dainippon Ink and Chemicals, Inc.), 5.31 g of a bisphenol A-novolac resin (trade name: VH-4170, product of Dainippon Ink and Chemicals, Inc.) and 0.01 g of 2-ethyl-4-methylimidazole (product of Tokyo Kasei Kogyo Co., Ltd.) in 22.5 g of γ-butyrolactone (vapor pressure at 25° C.: $2.3 \times 10^2$ Pa) to obtain a liquid crystal spacer-forming ink with a viscosity of 53.3 mPa·s and a surface tension of 44.1 mN/m.

(Evaluation of Discharge Property)

The discharge property of each of the liquid crystal spacer-forming inks of Examples 1-7 and Comparative Examples 1-3 (presence of clogging) was evaluated using an ink jet printing device (trade name: MJP-1500 V by Microjet Co.). As a result, the liquid crystal spacer-forming inks of Examples 1-7 and Comparative Example 1 were satisfactorily discharged without clogging of the ink-jet head. However, clogging of the ink-jet head was produced with the liquid crystal spacer-forming ink of Comparative Example 2. This is presumably because the liquid crystal spacer-forming ink of Comparative Example 2 employed methyl ethyl ketone having a vapor pressure of greater than $1.34 \times 10^3$ at 25° C. The liquid crystal spacer-forming ink of Comparative Example 3 could not be discharged. This is presumably because of the high viscosity of the liquid crystal spacer-forming ink of Comparative Example 3.

(Measurement of Printed Spacer Diameter)

The liquid crystal spacer-forming inks obtained in Examples 1-7 and Comparative Example 1 were used for printing at 25 pL per droplet using an ink jet printing device (trade name: MJP-1500 V, Microjet Co.) on a panel with a surface free energy of 31 mJ/m². It was then heated and dried for 60 minutes in an oven at 180° C. to form a dot-shaped liquid crystal spacer. The dot diameters were measured, and the diameters with the liquid crystal spacer-forming inks of Examples 1-7 were 50 μm, whereas the diameter was as large as 70 μm when using the liquid crystal spacer-forming ink of Comparative Example 1.

INDUSTRIAL APPLICABILITY

As explained above, the present invention can provide a liquid crystal spacer-forming ink that can form liquid crystal spacers with small dot diameters for liquid crystal display devices by ink jet printing, as well as a liquid crystal display device employing it.

The invention claimed is:

1. A liquid crystal spacer-forming ink, adapted to form spacers across an entire image display region of a liquid crystal display device, which comprises an insulating resin composition and a solvent with a vapor pressure of less than $1.34 \times 10^3$ Pa at 25° C., the insulating resin composition containing a material selected from the group consisting of monomers, oligomers and polymers forming epoxy resins, phenol resins, polyimide resins, polyamide resins, polyamideimide resins, silicone-modified polyamideimide resins, polyester resins, cyanate ester resins, bismaleimide-triazine resins, acrylic resins, melamine resins, urethane resins, and alkyd resins, the ink having a surface tension of at least 28 mN/m at 25° C. and a viscosity of no greater than 50 mPa·s at 25° C.

2. A liquid crystal spacer-forming ink according to claim 1, wherein the insulating resin composition contains a thermosetting resin selected from said group.

3. A liquid crystal spacer-forming ink according to claim 1, wherein the insulating resin composition contains an epoxy resin as said material, and a curing agent.

4. A liquid crystal spacer-forming ink according to claim 3, wherein the epoxy resin is a glycidyl ether compound obtained by condensation reaction of a phenol compound and an aldehyde compound.

5. A liquid crystal spacer-forming ink according to claim 3, wherein the curing agent is a condensation product obtained by condensation reaction of a phenol compound and an aldehyde compound.

6. A liquid crystal spacer-forming ink according to claim 1, which contains particles whose diameters have a standard deviation of no greater than 10%.

7. A liquid crystal spacer-forming ink according to claim 6, wherein the particles are particles having a mean particle size of 1.0-10.0 μm.

8. A liquid crystal spacer-forming ink according to claim 6, wherein the particles are particles composed of an inorganic compound.

9. A liquid crystal spacer-forming ink according to claim 6, wherein the particles are particles composed of an organic compound.

10. A liquid crystal display device comprising two panels situated opposite each other, a liquid crystal layer composed of a liquid crystal substance enclosed between the panels and liquid crystal spacers situated between the panels in order to maintain a consistent thickness of the liquid crystal layer, wherein the liquid crystal spacers are is formed at desired positions on the panels by ink jet printing using a liquid crystal spacer-forming ink according to claim 1.

11. A liquid crystal spacer-forming ink according to claim 1, wherein said surface tension is 28-80 mN/m at 25° C.

12. A liquid crystal spacer-forming ink according to claim 1, wherein said viscosity is 3-30 mPa·s at 25° C.

13. A liquid crystal spacer-forming ink according to claim 6, wherein a proportion of said particles in said ink is 0.01-25 mass % based on the total mass of the ink.

14. A liquid crystal display device according to claim 10, wherein said liquid crystal spacers are set across an entire image display region of the liquid crystal display device.

15. A liquid crystal display device according to claim 14, wherein said liquid crystal spacers are set at equal spacings across said entire image display region.

16. A liquid crystal display device according to claim 10, wherein said liquid crystal spacers are in a form of dots set at equal spacings across an entire image display region of the liquid crystal display device.

17. A liquid crystal display device according to claim 10, further including a sealant between the panels at an edge of the liquid crystal layer, serving to bond the panels.

* * * * *